(12) United States Patent
Higgins

(10) Patent No.: US 8,380,128 B2
(45) Date of Patent: Feb. 19, 2013

(54) USER INTERFACE FOR A COMMUNICATION SYSTEM

(75) Inventor: Robert J. Higgins, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 214 days.

(21) Appl. No.: 12/957,288

(22) Filed: Nov. 30, 2010

(65) Prior Publication Data

US 2012/0135685 A1    May 31, 2012

(51) Int. Cl.
  *H04B 7/00*    (2006.01)
(52) U.S. Cl. .................................. 455/41.2; 455/567
(58) Field of Classification Search .............. 455/41.2, 455/500, 502, 507–520, 552.1, 553.1, 556.1, 455/556.2, 566, 567, 90.1–90.2, 458, 464–466, 455/569.1–569.2; 348/14.01–14.04, 14.11, 348/14.12
See application file for complete search history.

(56) References Cited

U.S. PATENT DOCUMENTS

| | | | |
|---|---|---|---|
| 7,801,953 B1 | 9/2010 | Denman et al. | |
| 7,813,696 B2 | 10/2010 | Kim | |
| 7,865,205 B1 * | 1/2011 | Lundy et al. | 455/518 |
| 8,103,300 B2 * | 1/2012 | Gogic | 455/519 |
| 2003/0148779 A1 | 8/2003 | Aravamudan et al. | |
| 2006/0046756 A1 * | 3/2006 | Kies | 455/518 |
| 2006/0114314 A1 * | 6/2006 | Dunko | 348/14.1 |
| 2006/0146724 A1 * | 7/2006 | Ahya et al. | 370/252 |
| 2007/0080814 A1 * | 4/2007 | Ellsworth et al. | 340/573.1 |
| 2008/0209476 A1 * | 8/2008 | Shanks et al. | 725/59 |
| 2008/0318639 A1 | 12/2008 | Crestol | |

FOREIGN PATENT DOCUMENTS

KR    10-0791097 B1    1/2008

OTHER PUBLICATIONS

Glidercom., "Wireless Push to talk," accessed at http://www.glidercom.com/store/ptt_wl_system.html#, accessed on Aug. 17, 2012, pp. 4.
International Search Report and Written Opinion for International Application No. PCT/US2011/061760 mailed on Jul. 19, 2012.

* cited by examiner

*Primary Examiner* — Tuan A Tran
(74) *Attorney, Agent, or Firm* — Barbara R. Doutre

(57) ABSTRACT

A communication system is provided having an improved user interface in which an audible indicator is played out from an audio accessory to confirm radio transmission of a message sent from the audio accessory in response to activation of a wireless push-to-talk (PTT). The wireless PTT may be located on the audio accessory itself or embodied as a standalone device. The wireless PTT may be operated in conjunction with a two-way radio and a wired or wireless audio accessory device. The audible indicator ceases being played out of the accessory in response to deactivation of the wireless PTT and ending of the radio transmission.

25 Claims, 3 Drawing Sheets

USER INTERFACE FOR A COMMUNICATION SYSTEM

FIELD OF THE DISCLOSURE

The present disclosure relates generally to wireless communication systems and more particularly to push-to-talk features utilized in such systems.

BACKGROUND

Wired accessories having push-to-talk (PTT) capability are now regarded as so reliable that users take it for granted that a radio transmits a message when the PTT on the wired accessory is pressed. While conventional Bluetooth wireless systems do not support PTT functions, there are Bluetooth headsets being developed today which provide PTT capability. Wireless standalone PTT devices are also being developed to provide additional wireless means to PTT actuate the same transmitter. Unfortunately, Bluetooth headsets and wireless standalone PTT devices do not provoke the same user-perception of reliability as that of their wired counterparts. Some users have been known to make periodic wireless PTT test transmissions just to watch the transmit LED on the radio to insure the wireless PTT is operating correctly. Such actions add useless transmissions to the radio channel and divert the user's attention towards the radio rather than to the task at hand. In public safety operations, the ability to simplify the user's communication environment is an important aspect to be considered and such diversion of the user's attention is not desirable.

Accordingly, it would be beneficial to provide an improved user interface for short range wireless devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
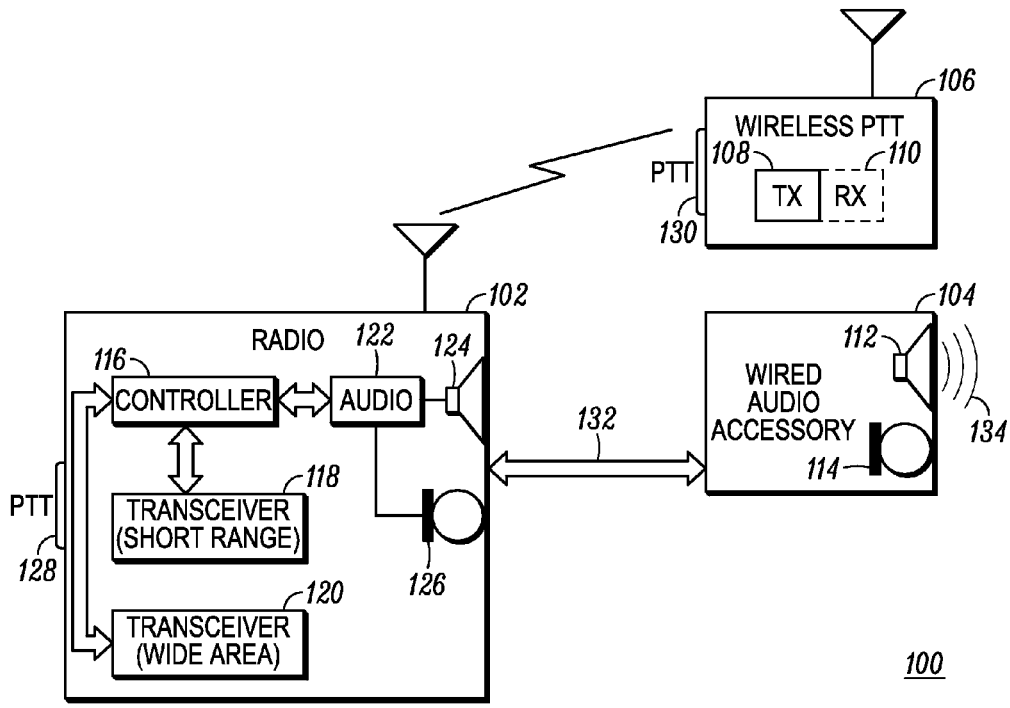
FIG. 1 is a block diagram of a communication system having a wired audio accessory providing an audible indicator in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with various embodiments to be described herein, there is provided a communication system having an improved user interface in which an audible indicator is played out from an audio accessory to confirm radio transmission of a message sent from the audio accessory in response to activation of a wireless push-to-talk (PTT). The wireless PTT may be located on the audio accessory itself or embodied as a wireless standalone device. The wireless PTT communicates over a wireless link with a portable two-way radio. The audio accessory may be a wired audio accessory that communicates with the portable two-way radio over a wired interface, or the audio accessory may be a wireless audio accessory that communicates with the portable radio over a wireless link. For the purposes of this application, an audible indicator comprises a sound or combination of sounds, tones, or alerts within an audible frequency range that can be played out of the audio accessory's speaker and heard by the user. For the purposes of this application, a message input into the audio accessory may be an audio signal or a data signal.

FIG. 1 is a block diagram of a communication system having a wired audio accessory providing an audible indicator in accordance with an embodiment. Communication system 100 comprises a portable two-way radio 102 having a wired audio accessory 104 coupled thereto, such as through an electronic interface cable 132. Communication system 100 further includes a wireless standalone PTT device 106 wirelessly coupled to the portable two-way radio 102. The wireless standalone PTT device 106 device includes at least a transmitter 108 and may or may not include a receiver 110. The wired audio accessory 104 includes at least a speaker 112 and a microphone 114. The portable two-way radio 102 includes a controller 116, short range transceiver circuitry 118, and wide range transceiver circuitry 120. Short range transceiver circuitry 118 provides short area coverage for communications with wireless accessories, and wide range transceiver circuitry 120 provides wide area transport of voice or data messages to another party. Portable two-way radio 102 further includes audio circuitry 122 including a microphone 124 and a speaker 126. Both the portable two-way radio 102 and wireless standalone PTT device 106 include PTT capability 128, 130 respectively.

In operation the user presses the PTT 130 of the wireless standalone PTT device 106 and begins entering a message at the wired audio accessory 104. The message may be voice or possibly data depending on the audio accessory configuration. As the message begins to be entered into the wired audio accessory 104, the message is transmitted via the wired electronic interface 132 to the portable two-way radio 102. As the portable two-way radio 102 begins to receive the incoming message, the portable two-way radio 102 begins to re-transmit the message to another party. In accordance with an embodiment, in response to activation of the PTT 130 at the wireless standalone PTT device 106, the wired audio accessory 104 plays an audible indicator 134 out of its speaker 112 confirming radio transmission of the message while the message is being transmitted from the portable two-way radio 102. The audible indicator 134 would typically continue to play out during the continuous signal transmission taking place between the wired audio accessory 104 and the portable two-way radio 102. The audible indicator 134 ceases being played out at the wired audio accessory 104 once the wireless PTT 130 is deactivated.

In accordance with an embodiment, the wireless standalone PTT device 106 may be located anywhere it can be easily accessed by the user of the portable two-way radio 102. For example, the wireless standalone PTT device 106 may be located on a helmet, on an arm band, on a bicycle, on handlebars, on sunglasses, on an identification badge, or anywhere within a short range of the user carrying the portable two-way radio 102. Further examples will be described in conjunction with FIG. 3.

Figure 2:
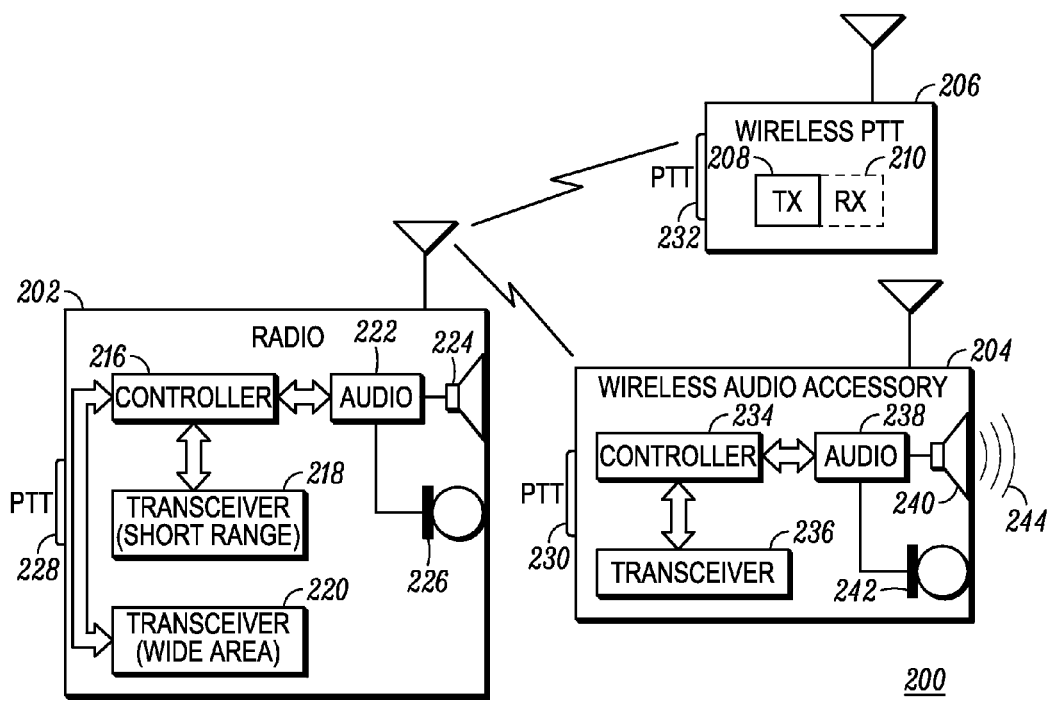
FIG. 2 is a block diagram of a communication system having a wireless audio accessory providing an audible indicator in accordance with an embodiment.

FIG. 2 is a block diagram of a communication system 200 having a wireless audio accessory providing an audible indicator in accordance with an embodiment. Communication system 200 comprises a two-way radio, shown as a portable two-way radio 202, having a wireless audio accessory 204 operatively coupled thereto. The wireless audio accessory 204 may have a wireless PTT 230, or the Communication system 200 further comprises a wireless PTT embodied as wireless PTT 230 and/or wireless PTT 232. Communication system 200 shows the wireless PTT embodied as a wireless standalone PTT device 206. Communication system 200 also shows the wireless PTT embodied as part of the wireless audio accessory 204.

For the case of the wireless standalone PTT device 206, the wireless standalone PTT device 206 includes at least a transmitter 208 and may or may not include a receiver 210. The portable two-way radio 202 includes a controller 216 and transceiver circuitry providing short range coverage and wide area coverage 218, 220 respectively, along with audio circuitry 222 including a speaker 224 and a microphone 226.

The portable two-way radio 202, the wireless audio accessory 204, and the wireless standalone PTT device 206, include PTT capability 228, 230, 232 respectively. In accordance with an embodiment, the wireless audio accessory 204 includes a controller 234, transceiver 236, and audio circuitry 238 including a speaker 240 and a microphone 242.

In operation, the user presses the PTT 232 of the wireless standalone PTT device 206 and enters a message (e.g. voice or data) at the wireless audio accessory 204. As the message begins to be entered into the wireless audio accessory 204, the message is transmitted via a wireless link to the portable two-way radio 202. As the portable two-way radio 202 begins to receive the incoming message, the portable two-way radio 202 begins to re-transmit the message to another party. In accordance with an embodiment, in response to activation of the PTT 232 of the wireless standalone PTT device 206 and the re-transmission of the message from the portable two-way radio, the wireless audio accessory 204 plays an audible indicator 244 out of its speaker 240 confirming radio transmission of the message. Thus, continuous signal transmission is taking place between the standalone PTT device 206 and the portable two-way radio 202, and continuous signal transmission is taking place between the wireless audio accessory 204 and portable two-way radio 202. As such, the audible alert 244 is played out of the wireless audio accessory 204 for the duration of the transmission until the PTT 232 is deactivated at the wireless PTT 206.

For the case of the wireless audio accessory 204 providing PTT capability 230, in operation, the user presses the PTT 230 of the wireless audio accessory 204 and enters a message (e.g. voice or data). The message is transmitted to the portable two-way radio 202 for re-transmission from the portable two-way radio 202. As the message begins to be entered into the wireless audio accessory 204, the message is transmitted via a wireless link to the portable two-way radio 202. As the portable two-way radio 202 begins to receive the incoming message, the portable two-way radio 202 begins to re-transmit the message to another party. In accordance with an embodiment, in response to activation of the wireless PTT 230 and re-transmission of the message from the portable two-way radio 202 to another party, the wireless audio accessory 204 plays an audible indicator 244 out of its speaker 240 confirming radio transmission of the message. Here again, continuous signal transmission is taking place between the wireless PTT device 230 and the portable two-way radio 202, and continuous signal transmission is taking place between the wireless audio accessory 204 and the portable two-way radio 202. As such, the audible indicator 244 is played out for the duration of the transmission until the PTT 230 is deactivated at the wireless audio accessory 204.

As described in the previous example, the wireless audio accessory 204 having PTT capability 230 need not operate in conjunction with the wireless standalone PTT 206. However, the wireless PTT 206 may be used in conjunction with the wireless audio accessory 204 if desired, giving the user an option of two possible PTTs. Having more than one PTT option allows the user increased flexibility in the use of the wireless audio accessory 204. Thus, wireless audio accessories, such as wireless headsets (with PTT capability and/or without PTT capability) can take advantage of the benefits of the audible indicator 244.

In accordance with an embodiment, the wireless standalone PTT device 206 may be located anywhere it can be easily accessed by the portable radio user. For example, the wireless standalone PTT device 206 may be located on a helmet, on an arm band, on handlebars, on sunglasses, on an identification badge, or anywhere within a short range link of the user carrying the portable radio. Further examples will be described in conjunction with FIG. 3.

Referring to FIGS. 1 and 2, communication systems 100, 200 operate within a larger communications network, such as a public safety network, a commercial enterprise management network, an individual-to-individual communications system, or the like, and operate within trunked or conventional two-way radio systems. While the portable two-way radios are typically simplex devices (communicate in only one direction at a time), it is possible that the radios and headsets also incorporate full duplex capability. The wide area transceivers 120, 220 provide communication typically using frequencies in the 1 MHz to 6 GHz range with transmitted powers of 0.1 watt to 100 watts to provide wide area communications over a distance of 0.5 kilometer to 100 kilometers. For the purposes of this application, the short range transceivers 118, 218 provide communication using low transmission field strength so as to provide a limited intended communication range of 1 meter to 100 meters. The wireless PTT devices 106, 206, 230 may utilize Bluetooth, Zigbee, UHF Remote Keyless Entry (RKE), WiFi, or other low power short range wireless link technology to transmit to the radio. The wireless audio accessories 104, 204 may utilize Bluetooth, WiFi VoIP, or other low power short range wireless link technology to communicate with the radio. Short range transmission provides the wireless electrical link between the wireless PTT and portable two-way radio. Short range transmission also provides the wireless electrical link between the wireless audio accessory and portable two-way radio.

Additionally in accordance with an embodiment, the audible indicators 134, 244 of communication systems 100, 200 respectively may be user selectable from a plurality of pre-programmed audio indicators. The pre-programmed audio indicators may be stored at the radios' controller 116, 216 and selected by the user depending on the environment within which the user will be operating the system. A variety of environment settings can be programmed into the radio such as, traffic, fire, outdoor foot patrol, court room, hospital, and office to name just a few examples having a wide range of background sound types and levels. The portable two-way radios 102, 202 may also incorporate background noise sensing circuitry as part of the audio circuitry 122, 222, to automatically adjust the audible indicator 134, 244 based on background noise level. The combination of user selectable audible indicator and automatic adjustment for background noise allows a user to move from one work scene to another with improved flexibility and without distraction. As a practical example, users of wireless Bluetooth headsets can now receive confirmation, via the pre-selected audible indicator, that a message entered into the headset has indeed been re-transmitted from the radio. As the user of the headset moves from one area to another, the pre-selected audible indicator is automatically adjusted for background noise without user intervention.

Figure 3:
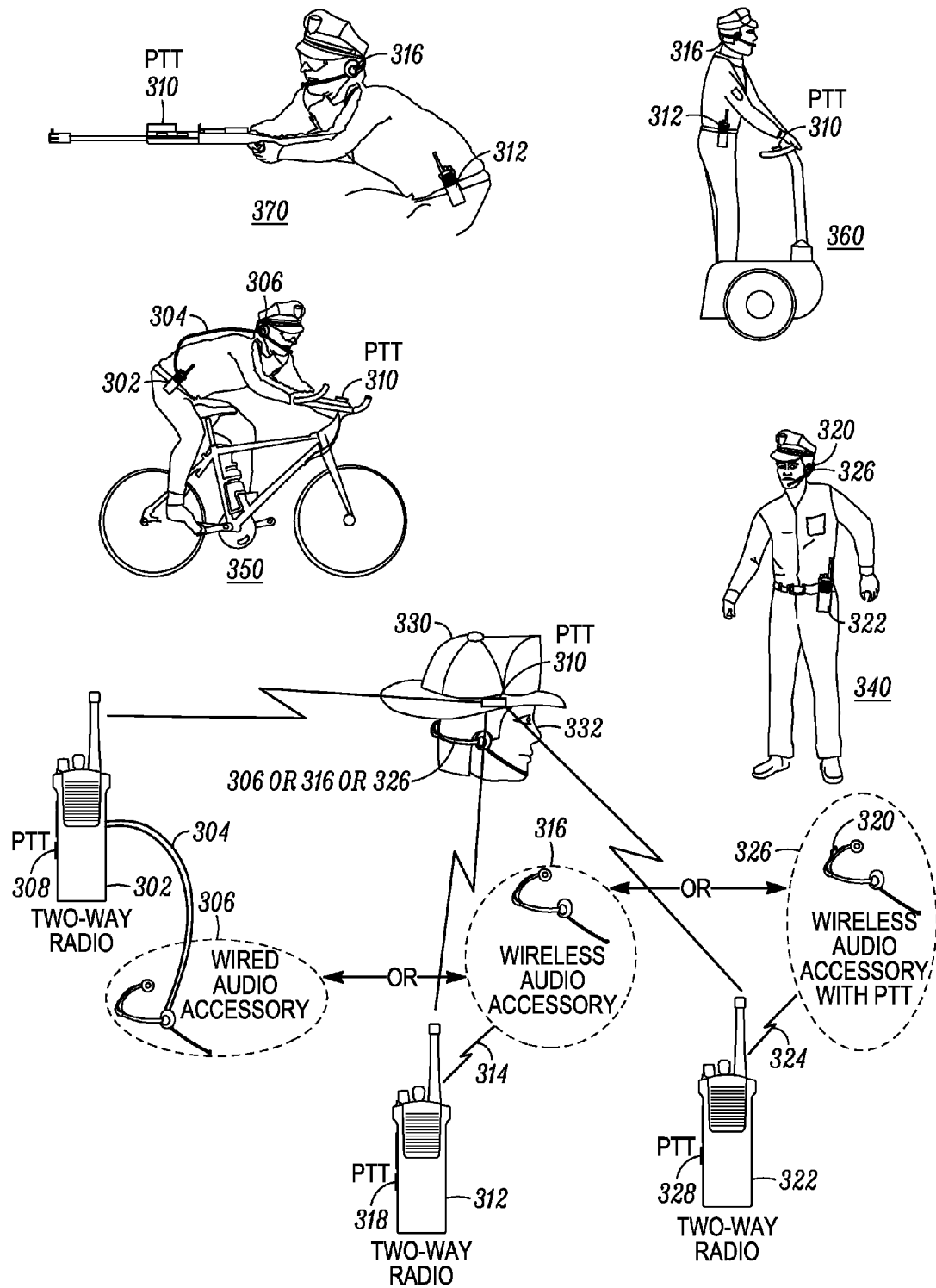
FIG. 3 shows various usage examples of the communication system in accordance with various embodiments.

FIG. 3 shows various usage examples of the communication systems 100, 200 operating in accordance with various embodiments. As a first set of examples, a user 332 wearing a helmet 330 having a wireless PTT 310 located thereon is provided with three different audio accessory choices in the form of a wired headset 306, a wireless headset 316, or a wireless headset with PTT 326. Each choice will be described.

The wired headset 306 is coupled via an interface cable 304 to portable two-way radio 302. Wired headset 306 may be worn by the user 332, for example by a firefighter wearing helmet 330 having a wireless PTT 310 located thereon. When the user 332 presses the wireless PTT 310 and enters a message (voice or data) into the wired headset 306, the message is carried through the interface cable 304 to the portable two-way radio 302. Wide area radio transmission of the message occurs at portable two-way radio 302 and confirmation of the radio transmission is provided to the user 332 via an audible indicator sent from the portable two-way radio 302 over the interface cable 304 and played out over a speaker of the wired headset 306.

For the wireless headset example, the wireless headset 316 is wirelessly coupled over a short range link 314 to a portable two-way radio 312. Wireless headset 316 may be worn by the user 332, for example by the firefighter, wearing helmet 330 having the wireless PTT 310 located thereon. When the user 332 presses the wireless PTT 310 and enters a message (voice or data) into the wireless headset 316, the message is transmitted over a short range link to the portable two-way radio 312. Wide area radio re-transmission of the message occurs at portable two-way radio 312, and confirmation of the radio re-transmission is provided to the user 332 via an audible indicator played out over a speaker of the wireless headset 316.

Moving to the wireless headset 326 having a wireless PTT 320 example, wireless coupling is provided from the accessory over a short range link 324 to a portable two-way radio 322. Wireless headset 326 may be worn by the user 332, such as a police officer or firefighter, who may or may not have access to other PTT devices. In operation, the user 332 presses the wireless PTT 320 and inputs a message (voice or data) into the wireless headset 326, the message is transmitted over the short range link 324 to the portable two-way radio 322. Wide area radio re-transmission of the message occurs at portable two-way radio 322 and confirmation of the radio re-transmission is provided to the user 332 via an audible indicator played out over a speaker of the wireless headset 326. Alternatively, rather than activating wireless PTT 320, the user 332 may press wireless PTT 310 and achieve the same result.

As previously discussed, the audible indicator will continue to play out of the speaker of the audio accessory as long as the wide area radio is transmitting the message and the wireless PTT is activated. For all three headsets 306, 316, or 326, the audible indicator will cease playing when the wireless PTT 310 (and wireless PTT 320) is deactivated.

FIG. 3 provides additional examples of the communication systems within different usage scenarios. A foot patrol scenario 340 shows the wireless headset 326 having the wireless PTT 320 in operation with radio 322. As a standalone device, the wireless PTT 310 may be located anywhere it is capable of transmitting a short range signal over a wireless link to the two-way radio. For example, scenario 350 shows the wireless PTT 310 located on handlebars of a bicycle providing a user interface for the radio 302 having wired headset 306. Scenario 360 shows the wireless PTT 310 located on controls of an electronic people mover interfacing with radio 312 having wireless headset 316. Scenario 370 shows the wireless PTT 310 coupled to the stock of a firearm for wirelessly linking with radio 312 having wireless headset 316. In all of the scenarios the audible indicator is played out of the speaker of the audio accessory in response to the PTT press, message entry at the audio accessory, and message re-transmission from the wide area radio. When the PTT is released and the transmission from the wide area radio stops, the audible indicator ceases to be played out at the audio accessory.

The wireless PTT 310 can be mounted either fixedly or removably to various devices, such as the devices described in FIG. 3. When the wireless PTT 310 is a removable portable device, the user can adjust the PTT's location relative to the user's current working environment. As long as the PTT is activated and the message is being re-transmitted from the wide area two-way radio, the audible indicator will be played out at the speaker of the audio accessory. Upon deactivation of the PTT, the audible indicator will cease.

In accordance with an embodiment, the audible indicator may be user selectable from a plurality of pre-programmed audio indicators. The pre-programmed indicators may be stored at the radio, such as radio 102, 202, 302, 312, or 322, and selected by the user depending on the environment within which the user will be working. For example, an audible indicator for use at a reasonably quiet indoor patrol watch may be a pink comfort noise having a level easily distinguished above the ambient sound level. For louder environments, such as a fire incident scene, the chosen audible indicator may comprise a voiced sound chosen to be noticeably different than that normally encountered in the environment so that it may be uniquely recognized by the operator. The two-way radio 102, 202, 302, 312, or 322, may also incorporate environmental background noise sensing circuitry which can be used to automatically adjust the audible indicator based on background noise level and characteristics. The combination of user selectable audible indicators and automatic adjustment of the audible alert allows a user to move from one work scene to another with much flexibility and without distraction. For example, a user riding a bicycle in an outdoor traffic scene using a wireless PTT on the handle bars can park the bicycle and go on foot-patrol using another wireless PTT (or the same wireless PTT if removable) located elsewhere about the body. The audible indicator can be adjusted by the user for the change in environment, if desired. The audible indicator will also be automatically adjusted to compensate for the change in the nature of the environmental background noise of the current scenario.

While the two-way radios shown in FIG. 3 have been illustrated as portable two-way radios (carried about a user's body), it is appreciated that the two-way radio can also be embodied as a mobile two-way radio, such as a mobile vehicular two-way radio. The wireless PTT may be located on a dashboard, worn by the user, or located on a wireless audio accessory within the mobile environment. The wireless PTT and mobile two-way radio communicate over a short range wireless link, as previously described. The wireless audio accessory and mobile two-way radio communicate over a short range wireless link, as previously described. The audible indicator is played out of the speaker of the wireless audio accessory in response to the PTT press, message entry at the audio accessory, and wide area message re-transmission from the mobile two-way radio.

Figure 4:
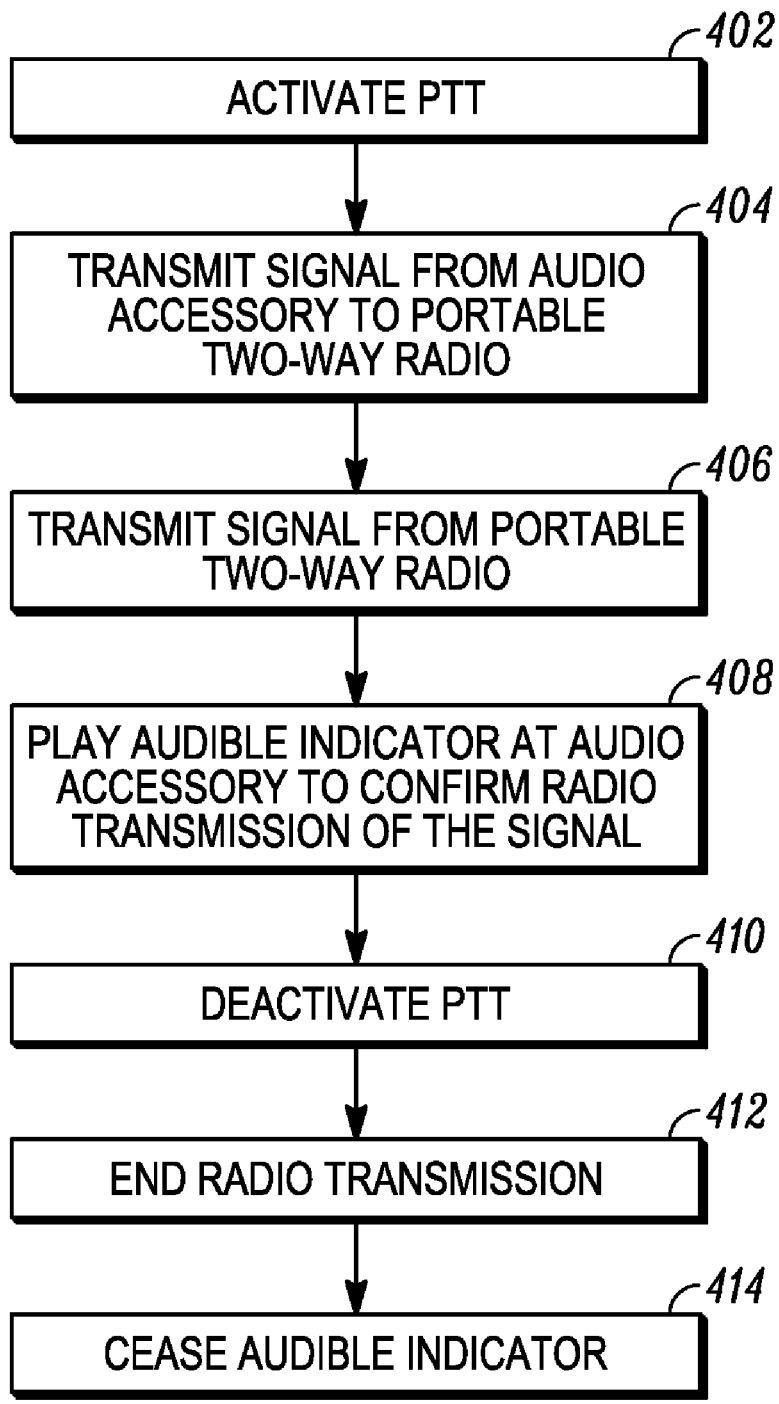
FIG. 4 is a flowchart of a method for operating the communication system in accordance with an embodiment.

Referring to FIG. 4, there is shown a method 400 for operating the communication system in accordance with an embodiment. Method 400 begins by activating a wireless push-to-talk (PTT) at 402. A signal is continuously transmitted, either wirelessly or via a wired interface, from the audio accessory to the portable two-way radio at 404. Radio transmission of the signal from the portable two-way radio to an outside party occurs at 406. At 406, the signal is continuously transmitted from the portable radio during the audio accessory's PTT activation. At 408, an audible indicator begins and continues to be played out at the audio accessory to confirm the radio transmission of the signal. Once the wireless PTT is deactivated at 410, the signal transmission from the portable radio ends at 412, and the audible indicator ceases being played out at the accessory at 414.

In accordance with the embodiment of FIG. 4, the wireless audio accessory is always delivering audio to the radio. The PTT is a separate signal to the wide area radio that instructs the radio to begin transmitting the audio that is always coming from the audio accessory. The PTT does not cause the transfer of audio from the audio accessory to the wide area radio. The PTT just signals the radio to transmit the accessory's audio. If the wireless accessory is inactive when the PTT has been signaled, the radio may activate the bi-directional short range link to the wireless audio accessory so that the accessory's microphone audio will be conveyed to the radio for re-transmission and the audible indicator may be played at the wireless audio accessory.

Accordingly, there has been provided an improved user interface for a communication system which provides an audio accessory playing an audible indicator to confirm radio transmission of a message sent from the audio accessory in response to activation of a wireless push-to-talk (PTT). The audible indicator operating in accordance with the various embodiments provides improved user-perception that a message entered into the headset has indeed been transmitted from the two-way radio. Additional improved user-perception can be achieved by providing the pre-programmed user-selectable indicators based on different user environments. Matching the audible alert to a particular user environment allows the user to continue working in the current scenario without diverting attention towards the radio or making unnecessary PTT transmissions. The user-perception may be further improved by including the automatic adjustment for background noise. Users of wireless audio accessories, such as wireless short range headsets, will find the audible indicator to be highly desirable.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A communication system, comprising:
a two-way radio;
an audio accessory operatively coupled to the two-way radio, the audio accessory transmitting a message to the two-way radio in response to activation of a wireless push-to-talk (PTT) for re-transmission of the message by the two-way radio; and
the audio accessory playing an audible indicator in response to the activation of the wireless PTT and the re-transmission of the message from the two-way radio, thereby confirming radio transmission of the message.

2. The communication system of claim 1, wherein the wireless PTT is located at the audio accessory and the audio accessory is a wireless audio accessory.

3. The communication system of claim 2, wherein the wireless audio accessory is a wireless headset.

4. The communication system of claim 3, wherein the wireless headset is a Bluetooth headset.

5. The communication system of claim 1, wherein the wireless PTT is a standalone wireless PTT device and the audio accessory is a wireless audio accessory.

6. The communication system of claim 1, wherein the wireless PTT is located at a standalone wireless PTT device and the audio accessory is a wired audio accessory.

7. The communication system of claim 1, wherein the audible indicator is user selectable from a plurality of pre-programmed audio indicators.

8. The communication system of claim 1, wherein the audible indicator is adjustable based on background noise level.

9. The communication system of claim 1, wherein the audio accessory comprises at least a speaker.

10. The communication system of claim 1, wherein the two-way radio comprises:
wide range transceiver circuitry for wide area transport of the message to another party; and
short range transceiver circuitry providing short area coverage for communication with the wireless PTT.

11. The communication system of claim 10, wherein the audio accessory is a wireless audio accessory, and the two-way radio comprises short range transceiver circuitry providing short area coverage for communication with the wireless audio accessory.

12. A method for confirming PTT activation of an audio accessory, comprising:
activating a wireless push-to-talk (PTT);
transmitting a signal from the audio accessory to a two-way radio;
re-transmitting the signal from the two-way radio; and
in response to activation of the wireless PTT and re-transmission of the signal from the two-way radio, playing an audible indicator at the audio accessory to confirm radio transmission of the signal.

13. The method of claim 12, further comprising;
deactivating the wireless PTT;
ending the radio transmission; and
ceasing the playing of the audible indicator at the audio accessory.

14. The method of claim 13, wherein the audio accessory comprises a wireless audio accessory.

15. The method of claim 14, wherein the wireless PTT is located at the wireless audio accessory.

16. The method of claim 15, wherein the wireless audio accessory comprises a headset.

17. The method of claim 16, wherein the headset comprises a Bluetooth headset.

18. The method of claim 13, wherein the audio accessory comprises a wired audio accessory.

19. The method of claim 18, wherein the wireless PTT is a standalone wireless PTT device.

20. The method of claim 13, wherein the audible indicator is pre-programmed and user-selectable based on environment.

21. The method of claim 13, the audible indicator is automatically adaptable based on background noise.

22. The method of claim 13, wherein the audio accessory comprises Bluetooth headset.

23. The method of claim 12, wherein activating the wireless PTT comprises:
activating the wireless PTT over a short range wireless link to communicate with the two-way radio.

24. The method of claim 23, wherein transmitting the signal from the audio accessory to the two-way radio comprises:
transmitting the signal from the audio accessory over a separate short range wireless link transmission to the two-way radio.

25. The method of claim 24, wherein transmitting the signal from the two-way radio comprises:
transmitting the signal from the two-way radio using a wide area radio transmission.

* * * * *

UNITED STATES PATENT AND TRADEMARK OFFICE
CERTIFICATE OF CORRECTION

PATENT NO. : 8,380,128 B2  
APPLICATION NO. : 12/957288  
DATED : February 19, 2013  
INVENTOR(S) : Higgins Page 1 of 1

It is certified that error appears in the above-identified patent and that said Letters Patent is hereby corrected as shown below:

In the Specification:

In Column 2, Lines 43-44, delete "microphone 124 and a speaker 126." and insert -- microphone 126 and a speaker 124. --, therefor.

In Column 4, Line 53, delete "WiFi VoIP," and insert -- WiFi, VoIP, --, therefor.

In the Claims:

In Column 10, Line 23, in Claim 21, delete "the audible" and insert -- wherein the audible --, therefor.

Signed and Sealed this  
Fourth Day of June, 2013

Teresa Stanek Rea  
*Acting Director of the United States Patent and Trademark Office*